United States Patent
Gong et al.

(10) Patent No.: US 10,171,210 B2
(45) Date of Patent: Jan. 1, 2019

(54) METHOD AND DEVICE FOR SPECTRUM COMB SIGNALING NOTIFICATION AND FOR SOUNDING REFERENCE SIGNAL TRANSMISSION

(71) Applicant: ZTE CORPORATION, Shenzhen, Guangdong Province (CN)

(72) Inventors: Yuhong Gong, Shenzhen (CN); Yunfeng Sun, Shenzhen (CN); Yuxin Wang, Shenzhen (CN); Shupeng Li, Shenzhen (CN); Chenchen Zhang, Shenzhen (CN); Min Ren, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 1048 days.

(21) Appl. No.: 14/768,765

(22) PCT Filed: Dec. 27, 2012

(86) PCT No.: PCT/CN2012/087698
§ 371 (c)(1),
(2) Date: Aug. 19, 2015

(87) PCT Pub. No.: WO2013/107265
PCT Pub. Date: Jul. 25, 2013

(65) Prior Publication Data
US 2016/0043842 A1 Feb. 11, 2016

(30) Foreign Application Priority Data
Jan. 19, 2012 (CN) .......................... 2012 1 0018143

(51) Int. Cl.
*H04L 5/00* (2006.01)
*H04W 72/04* (2009.01)

(52) U.S. Cl.
CPC .......... *H04L 5/0048* (2013.01); *H04L 5/0035* (2013.01); *H04L 5/0094* (2013.01); *H04W 72/042* (2013.01); *H04W 72/0453* (2013.01)

(58) Field of Classification Search
CPC ... H04L 5/0048; H04L 5/0094; H04L 5/0035; H04W 72/0453; H04W 72/042; H04W 72/04
See application file for complete search history.

(56) References Cited

U.S. PATENT DOCUMENTS

2008/0139237 A1* 6/2008 Papasakellariou .... H04W 52/36
455/522
2012/0275411 A1* 11/2012 Kim ...................... H04L 5/0032
370/329

FOREIGN PATENT DOCUMENTS

CN 101772031 A 7/2010
CN 102244557 A 11/2011
(Continued)

*Primary Examiner* — Anez C Ebrahim
(74) *Attorney, Agent, or Firm* — Ling Wu; Stephen Yang; Ling and Yang Intellectual Property (57) ABSTRACT

Disclosed are a spectrum comb signaling notification and sounding reference signal transmission method and device, wherein the spectrum comb signaling notification method includes: a network side configuring and notifying a receiving side of a two-layer comb spectrum signaling, including a first spectrum comb signaling and a second spectrum comb signaling, wherein the two-layer comb spectrum signaling indicates sub-carrier positions of transmitting the sounding reference signals to the receiving side.

15 Claims, 3 Drawing Sheets

A: even-numbered subcarrier positions with the subcarrier index of comb=0

B: odd-numbered subcarrier positions with the subcarrier index of comb=0

(56) References Cited

FOREIGN PATENT DOCUMENTS

CN 102282780 A 12/2011
EP 1107499 A1 6/2001

* cited by examiner

A: even-numbered subcarrier positions with the subcarrier index of comb=0

B: odd-numbered subcarrier positions with the subcarrier index of comb=0

METHOD AND DEVICE FOR SPECTRUM COMB SIGNALING NOTIFICATION AND FOR SOUNDING REFERENCE SIGNAL TRANSMISSION

TECHNICAL FIELD

The present document relates to the field of communications, and more particularly, to a method and device for notifying a spectrum comb signaling of an uplink Sounding Reference Signal (SRS) in a long-term evolution-advanced (LTE-A) system, and a SRS transmission method and device.

BACKGROUND OF THE RELATED ART

In the LTE-A system, in order to increase the transmission rate at the cell edge, the 3rd Generation Partner Project (3GPP) sets forth the coordinated multi-point Transmission and Reception (CoMP) technology at the R11 stage, and this technology mainly increases the data transmission rate of edge users through inter-cell coordination. Although the CoMP technology improves the throughput of the edge users, it also increases complexity of the network system.

Figure 1:
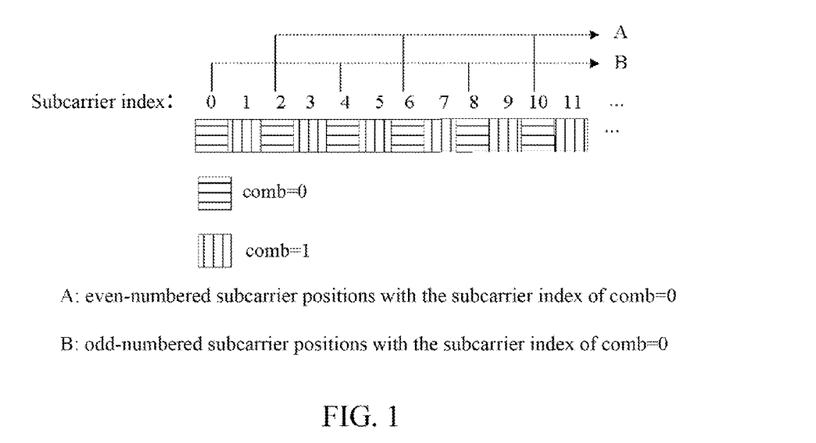
FIG. 1 is a schematic diagram of a SRS comb structure in the related art.

Within the same SRS bandwidth in the LTE system, SRS sub-carriers are spaced apart, that is, the SRS transmission uses the comb structure. The number of spectrum combs in the LTE system is 2, which also corresponds to the RePetition Factor (referred to as RPF) of 2 in the time domain. FIG. 1 is a schematic diagram of the SRS comb structure in the related art. Users only use sub-carriers whose frequency domain index is an even or odd number to transmit the SRS according to the instruction of the 1-bit upper layer signaling. This comb structure allows more users to transmit the SRS within the same SRS bandwidth.

In the same SRS bandwidth, multiple users use different cyclic shifts in the same frequency comb, and then send the SRS through code division multiplexing, or two users can transmit the SRS in different spectrum combs through frequency-division multiplexing. Specifically, in the LTE system, users transmitting the SRS within a certain SRS bandwidth (four resource blocks) can use eight cycle shifts and 2 spectrum combs, so that the users have a total of 16 resources to transmit the SRS. That is, up to 16 SRSs can be transmitted simultaneously in this SRS bandwidth. The LTE system only supports the SIMO (Single Input Multiple Output), therefore up to 16 users can be supported simultaneously, but the LTE-A system supports the MIMO (Multiple Input Multiple Output), therefore, only four users can be simultaneously supported for 4-antenna users.

Aiming to the problem of SRS resource shortage brought by multiple antennas, the LTE-A introduced the aperiodic SRS at the R10 stage. The aperiodic SRS improves flexible configuration and effective utilization of SRS resources through dynamical triggering, but it does not fundamentally improve the SRS resource capacity.

The 3GPP proposed a variety of scenarios for the CoMP technology, and in addition to the conventional homogeneous network scenarios, there are also heterogeneous network scenarios. In the heterogeneous network scenarios, especially in the fourth CoMP scenario, the macro cell and all micro cells under its coverage use the same cell identifier, and compared with the traditional networks, the number of users supported under the same cell identifier is greatly increased. At the R8/9/10 stage, the SRS resources are associated with cell identifiers, that is, although the existing SRS resources are sufficient for traditional cells in the R8/9/10, but for the R11 cells especially for the fourth CoMP scenario, it may be far from enough. Based on this requirement, many technologies are proposed to extend the SRS comb, by expanding the spacing of SRS subcarrier, the original two comb values (RPF=2) are extended to four comb values (RPF=4). The comb extension can effectively increase the SRS capacity, and the related art also proves that the extended SRS channel detection performance degradation is in the acceptable range, but the backward compatibility problem is one of the key issues deciding whether it can be adopted by the LTE standard in the future or not.

SUMMARY OF THE INVENTION

The embodiment of the present invention provides a spectrum comb signaling, sounding reference signal transmission method and device to overcome the defects of scheduling restriction and scheduling complexity existing when R11 and later-version users and R8/9/10 users are in pairs or the R11 and later-version users are in pairs under the SRS comb extension situation.

A spectrum comb signaling notification method in accordance with an embodiment of the present invention, comprises:

a network side configuring and notifying a receiving side of a two-layer spectrum comb signaling, including a first spectrum comb signaling and a second spectrum comb signaling, and the two-layer spectrum comb signaling indicating subcarrier positions of transmitting sounding reference signals to the receiving side.

Preferably, the first spectrum comb signaling is used to instruct a first user at the receiving side to determine subcarrier positions of transmitting the sounding reference signals, and the second spectrum comb signaling is used to instruct a second user at the receiving side to determine subcarrier positions of transmitting the sounding reference signals.

Preferably, the second spectrum comb signaling is a 3-bit high layer signaling, and an attribute of the 3-bit high layer signaling is UE-specific.

Preferably, the second spectrum comb signaling performs joint encoding on a repetition factor and a spectrum comb value, instructs the second user to occupy subcarrier positions whose subcarrier indexes are a multiple of 2, and a multiple of 2 plus 1, 4, a multiple of 4, a multiple of 4 plus 1, a multiple of 4 plus 2 or a multiple of 4 plus 3 within a sounding signal bandwidth.

Preferably, the first spectrum comb signaling is used for instructing the user to determine first subcarrier positions of transmitting the sounding reference signals, the second spectrum comb signaling is used for instructing the user to determine second subcarrier positions of transmitting the sounding reference signals;

the first subcarrier positions are odd-numbered subcarrier positions or even-numbered subcarrier positions within a sounding reference signal transmission bandwidth;

the second subcarrier positions are part or all of subcarrier positions in the first subcarrier positions within the sounding reference signal transmission bandwidth.

Preferably, the second spectrum comb signaling comprises a 1-bit high layer signaling or a 2-bit high layer signaling, and an attribute of the 1-bit high-layer signaling or the 2-bit high-layer signaling is UE-specific.

Preferably, when the second spectrum comb signaling is 1-bit high-layer signaling, the second sub-carrier positions comprise:

odd-numbered subcarrier positions with odd-numbered subcarrier indexes within a sounding bandwidth of the sounding reference signals;

even-numbered subcarrier positions with odd-numbered subcarrier indexes within the sounding bandwidth of the sounding reference signals;

odd-numbered subcarrier positions with even-numbered subcarrier indexes within the sounding bandwidth of the sounding reference signals; or even-numbered subcarrier positions with even-numbered subcarrier indexes within the sounding bandwidth of the sounding reference signals.

Preferably, when the second spectrum comb signaling is a 2-bit high-layer signaling, the second subcarrier positions comprise:

odd-numbered subcarrier positions with odd-numbered subcarrier indexes within the sounding bandwidth of the sounding reference signals;

even-numbered subcarrier positions with odd-numbered subcarrier indexes within the sounding bandwidth of the sounding reference signals;

odd-numbered subcarrier positions with even-numbered subcarrier indexes within the sounding bandwidth of the sounding reference signals;

even-numbered subcarrier positions with even-numbered subcarrier indexes within the sounding bandwidth of the sounding reference signals;

all subcarrier positions with the odd-numbered subcarrier indexes within the sounding bandwidth of the sounding reference signals; or all subcarrier positions with the even-numbered subcarrier indexes within the sounding bandwidth of the sounding reference signals.

Preferably, the second spectrum comb signaling is a 1-bit physical layer signaling or a 2-bit physical layer signaling.

Preferably, when the second spectrum comb signaling is a 1-bit physical layer signaling, it is used to instruct the user to occupy the odd-numbered sub-carrier positions or the even-numbered subcarrier positions of subcarriers determined by the first spectrum comb signaling to transmit the sounding reference signals;

when the second spectrum comb signaling is a 2-bit physical layer signaling, it is used to instruct the user to occupy the odd-numbered subcarrier positions or the even-numbered subcarrier positions or all the subcarrier positions of the subcarriers determined by the first spectrum comb signaling to transmit the sounding reference signals;

Preferably, the second spectrum comb signaling is a K-bit physical layer signaling, and the K-bit physical layer signaling is one or more of in the following information:

3-bit information indicating a cyclic shift and orthogonal mask index of a demodulation reference signal;

request information of a measurement reference signal;

high 1 bit or high 2 bits of resource block allocation information;

high 1 bit or high 2 bits of modulation and coding scheme and redundancy version indication information;

modulation and coding scheme and redundancy version indication information corresponding to a not-enabled transport block; and transmission power control signaling of a physical uplink control channel;

wherein, K is an integer greater than zero.

Preferably, the first user is a 3GPP R8/9/10 user, and the second user is a 3GPP R11 or later-version user.

A sounding reference signal transmission method in accordance with an embodiment of the present invention, comprises:

a receiving side receiving a two-layer spectrum comb signaling, including a first spectrum comb signaling and a second spectrum comb signaling, notified by a network side, and transmitting sounding reference signals in subcarrier positions indicated by the two-layer spectrum comb signaling.

Preferably, a first user at the receiving side transmits the sounding reference signals in subcarrier positions indicated by the first spectrum comb signaling, a second user at the receiving side transmits the sounding reference signals in subcarrier positions indicated by the second spectrum comb signaling.

A spectrum comb signaling notification device in accordance with an embodiment of the present invention, comprises:

a configuration module, configured to: configure a two-layer spectrum comb signaling, including a first spectrum comb signaling and a second spectrum comb signaling, for a receiving side;

a notification module, configured to notify the receiving side of a spectrum comb signaling configured by the configuration module.

Preferably, the configuration module is configured to: configure the first spectrum comb signaling to be used to instruct a first user at the receiving side to determine subcarrier positions of transmitting the sounding reference signals, configure the second spectrum comb signaling to be used to instruct a second user at the receiving side to determine subcarrier positions of transmitting the sounding reference signals.

Preferably, the configuration module is configured to: perform joint encoding on a repetition factor and a spectrum comb value to generate the second spectrum comb signaling to instruct the second user to occupy subcarrier positions whose subcarrier indexes are a multiple of 2, a multiple of 2 plus 1, a multiple of 4, a multiple of 4 plus 1, a multiple of 4 plus 2, or a multiple of 4 plus 3 within a sounding signal bandwidth.

Preferably, the configuration module is configured to: configure the first spectrum comb signaling to instruct the user to determine first subcarrier positions of transmitting the sounding reference signals, configure the second spectrum comb signaling to instruct the user to determine second subcarrier positions of transmitting the sounding reference signals;

the first subcarrier positions are odd-numbered subcarrier positions or even-numbered subcarrier positions within a sounding reference signal transmission bandwidth;

the second subcarrier positions are part or all of subcarrier positions in the first subcarrier positions within the sounding reference signal transmission bandwidth.

Preferably, the configuration module is configured to: configure the second spectrum comb signaling as 1-bit high layer signaling, and the second subcarrier positions comprise:

odd-numbered subcarrier positions with odd-numbered subcarrier indexes within a sounding bandwidth of the sounding reference signals;

even-numbered subcarrier positions with odd-numbered subcarrier indexes within the sounding bandwidth of the sounding reference signals;

odd-numbered subcarrier positions with even-numbered subcarrier indexes within sounding the bandwidth of the sounding reference signals; or even-numbered subcarrier positions with even-numbered subcarrier indexes within the sounding bandwidth of the sounding reference signals.

Preferably, the configuration module is configured to: configure the second spectrum comb signaling to be a 2-bit high layer signaling, and the second subcarrier positions comprise:

odd-numbered subcarrier positions with odd-numbered subcarrier indexes within the sounding bandwidth of the sounding reference signals;

even-numbered subcarrier positions with odd-numbered subcarrier indexes within the sounding bandwidth of the sounding reference signals;

odd-numbered subcarrier positions with even-numbered subcarrier indexes within the sounding bandwidth of the sounding reference signals;

even-numbered subcarrier positions with even-numbered subcarrier indexes within the sounding bandwidth of the sounding reference signals;

all subcarrier positions with the odd-numbered subcarrier indexes within the sounding bandwidth of the sounding reference signals; or all subcarrier positions with the even-numbered subcarrier indexes within the sounding bandwidth of the sounding reference signals.

Preferably, the configuration unit is configured to: configure the second spectrum comb signaling as 1-bit physical layer signaling which is used to instruct the user to occupy odd-numbered subcarrier positions or even-numbered subcarrier positions of the subcarriers determined by the first spectrum comb signaling to transmit the sounding reference signals; or configure the second spectrum comb signaling as a 2-bit physical layer signaling which is used to instruct the user to occupy the odd-numbered subcarrier positions or the even-numbered subcarrier positions or all subcarrier positions of the subcarriers determined by the first spectrum comb signaling to transmit the sounding reference signals.

Preferably, the configuration module is configured to: configure the second spectrum comb signaling to be a K-bit physical layer signaling, and the K-bit physical layer signaling is one or more of the following information:

3-bit information indicating a cyclic shift and orthogonal mask index of a demodulation reference signal;

request information of a measurement reference signal;

high 1 bit or high 2 bits of resource block allocation information;

high 1 bit or high 2 bits of a modulation and coding scheme and redundancy version indication information;

modulation and coding scheme and redundancy version indication information corresponding to a not-enabled transport block; and transmission power control signaling of the physical uplink control channel;

wherein, K is an integer greater than zero.

A sounding reference signal transmission device in accordance with an embodiment of the present invention, comprises:

a receiving module, configured to: receive a two-layer spectrum comb signaling, including a first spectrum comb signaling and a second spectrum comb signaling, notified by a network side; and a transmitting module, configured to: transmit sounding reference signals in subcarrier positions indicated by the spectrum comb signaling received by the receiving module.

Preferably, the transmitting module is configured to: transmit the sounding reference signals of a first user in subcarrier positions indicated by the first spectrum comb signaling, and transmit the sounding reference signals of a second user in subcarrier positions indicated by the second spectrum comb signaling.

Preferably, the transmitting module is configured to: transmit the sounding reference signals of the second user in subcarrier positions which are indicated by the second spectrum comb signaling and whose subcarrier indexes are a multiple of 2, and a multiple of 2 plus 1, a multiple of 4, a multiple of 4 plus 1, a multiple of 4 plus 2, or a multiple of 4 plus 3 within the occupied sounding signal bandwidth.

Preferably, the transmitting module is configured to: determine first subcarrier positions of transmitting the sounding reference signals according to the first comb spectrum signaling, determine second subcarrier positions of transmitting the sounding reference signals according to the second spectrum comb signaling;

the first subcarrier positions are odd-numbered subcarrier positions or even-numbered sub-carrier positions in the sounding reference signal transmission bandwidth;

the second sub-carrier positions are part or all of subcarrier positions in the first sub-carrier positions in the sounding reference signal transmission bandwidth.

Compared with the related art, in the embodiment of the present invention, the R11 and later-version users and the R8/9/10 users are in pairs or the R11 and later-version users are in pairs in the case of the SRS comb extension, which can reduce the scheduling restrictions and scheduling complexity due to the pairing, and is in favor of solving the backward compatibility problem caused by the SRS extension.

Other features and advantages of the present document will be set forth in the following description, and in part will be obvious from the description, or be learned by practicing the present document. The objectives and other advantages of the present document may be implemented and achieved through the structure particularly pointed out in the description, the accompanying drawings, and the claims.

BRIEF DESCRIPTION OF THE DRAWINGS

The accompanying drawings are used to provide a further understanding of the technical scheme of the present document and constitute a part of this specification, together with the embodiments of the present invention, serve to explain the technical scheme of the present document and are not construed as limiting the technical scheme of the present document.

PREFERRED EMBODIMENTS OF THE INVENTION

Hereinafter, in conjunction with the accompanying drawings and embodiments, the implementations of the present document will be described in detail, whereby to fully understand the implementation process of how the present document applies technical means to solve technical problems and to achieve technical effects, and then it is implemented accordingly.

First, if there is no conflict, combinations of the embodiments and various features in the embodiments of the present invention are within the protection scope of the present document on the premise of without conflict. Furthermore, steps illustrated in the flow chart in the accompanying drawings can be implemented in a computer system such as a group of computer-executable commands, moreover, although a logical order is shown in the flow chart, in some cases, steps shown or described herein may be performed in a different order.

Figure 5:
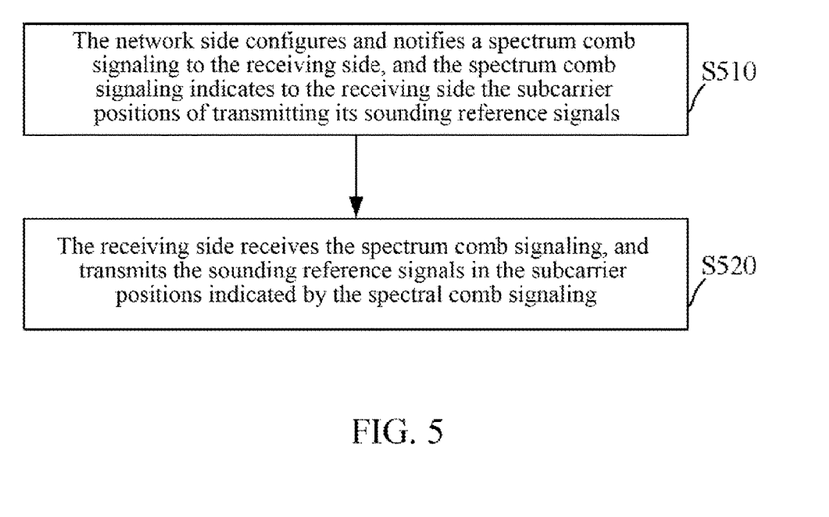
FIG. 5 is a flow chart of a spectrum comb signaling configuration and notification method of a sounding reference signal in accordance with an embodiment of the present invention.

As shown in FIG. 5, the spectrum comb signaling configuration and notification method of sounding reference signal in accordance with the embodiment of the present invention mainly comprises:

in step S510, the network side configures and notifies a spectrum comb signaling to the receiving side, and the spectrum comb signaling indicates to the receiving side the subcarrier positions of transmitting its sounding reference signals;

in step S520, the receiving side receives the spectrum comb signaling notified by the network side, and transmits the sounding reference signals in the subcarrier positions indicated by the spectrum comb signaling.

Wherein, the abovementioned step S510 is a method for a network side notifying a spectrum comb signaling of sounding reference signal in accordance with an embodiment of the present invention, and the abovementioned step S520 is a method for the receiving side transmitting the SRS according to the notification method of the step S510 in the embodiment of the present invention.

The First Method:

the network side configures and notifies the receiving side of a two-layer spectrum comb signaling, including the spectrum comb (referred to as the first spectrum comb) signaling in the existing protocols and a new spectrum comb (referred to as the second spectrum comb) signaling. The second spectrum comb signaling is a 1-bit high-layer signaling, and there are two high-layer signaling attributes: one is cell-specific, and the other is UE-specific, and the attribute of 1-bit high-layer signaling is UE-specific.

The network side configures the first spectrum comb signaling for the R8/9/10 users and the R11 and later-version users, and configures the second spectrum comb signaling for the R11 and later-version users. Wherein the first spectrum comb signaling is used for instructing the R8/9/10 users and the R11 and later-version users to determine subcarrier positions of transmitting the sounding reference signals, and the second spectrum comb signaling is used for instructing the R11 and later-version users to determine the subcarrier positions of transmitting the sounding reference signals.

The network side notifies the R8/9/10 users of the first spectrum comb signaling, the R8/9/10 users directly determines their SRS subcarrier positions according to the instruction of the first spectrum comb signaling.

The network side notifies or does not notify the R11 and later-version users of the second spectrum comb signaling; if the R11 or later-version users receive the second spectrum comb signaling, the users determine their SRS subcarrier positions in accordance with the instruction of the second spectrum comb signaling on the basis of the first spectrum comb, including only using subcarriers whose frequency domain index is an even number or odd number to transmit the SRS; if the R11 or later-version users do not receive the second spectrum comb signaling, their SRS subcarrier positions are determined in accordance with the instruction of first spectrum comb, specifically, subcarriers with all frequency domain indexes are used to send the SRS.

The Second Method:

The network side configures and notifies the receiving side of a two-layer spectrum comb signaling, including the spectrum comb (referred to as the first spectrum comb) signaling in the existing protocols and a new spectrum comb (referred to as the second spectrum comb) signaling. The second spectrum comb signaling is a 2-bit high-layer signaling, and the attribute of 2-bit high-layer signaling is UE-specific.

The network side configures and notifies the R8/9/10 users of the first spectrum comb signaling and configures the R11 and later-version users with the second spectrum comb signaling. Wherein the first spectrum comb signaling is used for instructing the R8/9/10 users to determine subcarrier positions of transmitting the sounding reference signals, the second spectrum comb signaling is used for instructing the R11 and later-version users to determine subcarrier positions of transmitting the sounding reference signals.

The network side notifies the R8/9/10 users of the first spectrum comb signaling, the R8/9/10 users directly determine their SRS subcarrier positions according to the instruction of the first spectrum comb signaling.

The network side notifies the R11 and later-version users of the second spectrum comb signaling; the R11 and later-version users determine their SRS subcarrier positions in accordance with the instruction of the received second spectrum comb signaling, including only using subcarriers whose frequency domain index is an even number or odd number to transmit the SRS, or using the subcarriers with all frequency domain indexes to transmit the SRS.

The Third Method:

The network side configures and notifies the receiving side of two types of spectrum comb commands, including the spectrum comb (referred to as the first type of spectrum comb) signaling in existing protocols and a new spectrum comb (referred to as the second type of spectrum comb) signaling. The second type of spectrum comb signaling is a 3-bit high-layer signaling, and the attribute of the 3-bit high-layer signaling is UE-specific, and the second type of spectrum comb signaling performs joint encoding on the repetition factor and the spectrum comb value, that is, it jointly indicates the user's SRS repetition factor and spectrum comb value.

The network side configures and notifies the R8/9/10 users with the first type of spectrum comb signaling, and configures the R11 and later-version users with the second spectrum comb signaling. Wherein the first spectrum comb signaling is used for instructing the R8/9/10 users to determine subcarrier positions of transmitting the sounding reference signals, and the second spectrum comb signaling is used for instructing the R11 and later-version users to determine subcarrier positions of transmitting the sounding reference signals.

The network side notifies the R8/9/10 users of the first spectrum comb signaling, and the R8/9/10 users determines their SRS subcarrier positions according to the instruction of the first spectrum comb signaling, wherein, the R8/9/10 users consider that their repetition factor is equal to 2 by default.

The network side configures and notifies the R11 and later-version users of the second spectrum comb signaling; the R11 and later-version users determines their SRS repetition factor and spectrum comb value according to the instruction of the second spectrum comb signaling, so as to determine the SRS subcarrier positions.

The Fourth Method:

The network side configures and notifies the receiving side of a two-layer spectrum comb signaling, including the spectrum comb (referred to as the first spectrum comb) signaling in existing protocols and a new spectrum comb (referred to as the second spectrum comb) signaling. The second spectrum comb signaling is a 1-bit high-layer signaling, and it is the new 1-bit signaling in the existing physical layer signaling. The first spectrum comb signaling is used for instructing the R8/9/10 users to determine subcarrier positions of transmitting the sounding reference signals, and the second spectrum comb signaling is used for instructing the receiving side to occupy odd-numbered subcarrier positions or even-numbered subcarrier positions of the subcarriers determined by the first spectrum comb signaling.

The network side configures and notifies the R8/9/10 users and the R11 and later-version users of the first spectrum comb signaling and the second spectrum comb signaling.

The R8/9/10 users directly determine their SRS subcarrier positions according to the instruction of the first spectrum comb signaling.

The R11 and later-version users determine their SRS subcarrier positions according to the received first spectrum comb signaling and the second spectrum comb signaling, according to the second spectrum comb signaling on the basis of the instruction of the first spectrum comb signaling.

The Fifth Method:

The network side configures and notifies the receiving side of a two-layer spectrum comb signaling, including the spectrum comb (referred to as the first spectrum comb) signaling in existing protocols and a new spectrum comb (referred to as the second spectrum comb) signaling. The second spectrum comb signaling is a 2-bit physical layer signaling, and it is the new 2-bit signaling in the existing physical layer signaling. The first spectrum comb signaling is used for instructing the R8/9/10 users to determine subcarrier positions of transmitting the sounding reference signals, and the second spectrum comb signaling is used for instructing the receiving side to occupy even-numbered subcarrier positions or odd-numbered subcarrier positions of the subcarriers determined by the first spectrum comb signaling to transmit the SRS, or instructing the receiving side to occupy all subcarrier positions determined by the first spectrum comb signaling to transmit the SRS.

The network side configures and notifies the R8/9/10 users and the R11 and later-version users of the first spectrum comb signaling and the second spectrum comb signaling.

The R8/9/10 users directly determine their SRS subcarrier positions according to the instruction of the first spectrum comb signaling.

The R11 and later-version users determine their SRS subcarrier positions according to the received first spectrum comb signaling and the second spectrum comb signaling, according to the second comb spectrum signaling on the basis of the instruction of the first spectrum comb signaling.

The Sixth Method:

The network side configures and notifies the receiving side of the two-layer spectrum comb signaling, including the spectrum comb (referred to as the first spectrum comb) signaling in existing protocols and a new spectrum comb (referred to as the second spectrum comb) signaling. The second spectrum comb signaling is a K-bit (K is an integer greater than 0) physical layer signaling and uses the existing bits in the physical layer signaling to perform an implicit indication. The first spectrum comb signaling is used for instructing the R8/9/10 users to determine subcarrier positions of transmitting the sounding reference signals, and the second spectrum comb signaling is used for instructing the R11 and later-version users to determine their SRS subcarrier positions according to the second spectrum comb signaling on the basis of the instruction of the first spectrum comb signaling.

The network side configures and notifies the R8/9/10 users and the R11 and later-version users of the first spectrum comb signaling and the second spectrum comb signaling.

The R8/9/10 users directly determine their SRS subcarrier positions according to the instruction of the first spectrum comb signaling.

The R11 and later-version users determine their SRS subcarrier positions according to the received first spectrum comb signaling and the second spectrum comb signaling, according to the second comb spectrum signaling on the basis of the instruction of the first spectrum comb signaling.

The existing K-bit physical layer signaling may be one or more of the following information:

(1) 3-bit information indicating the cyclic shift and orthogonal mask index of the demodulation reference signal;

(2) request information of a measurement reference signal;

(3) high 1 bit or high 2 bits of resource block allocation information;

(4) high 1 bit or high 2 bits of modulation and coding scheme and redundancy version indication information;

(5) modulation and coding scheme and redundancy version indication information corresponding to the not-enabled transport block; and (6) transmission power control signaling of the physical uplink control channel.

The spectrum comb signaling configuration and notification method of sounding reference signal provided in the embodiment of the present invention can pair the R11 and later-version users and the R8/9/10 users or the R11 and later-version users under the SRS comb extension condition, which can reduce the scheduling restriction and scheduling complexity due to the pairing, and is helpful to solving the backward compatibility issue caused by the SRS extension.

The First Embodiment

The network side configures and notifies the receiving side of a two-layer spectrum comb signaling, including the spectrum comb (referred to as the first spectrum comb) signaling in existing protocols and a new spectrum comb (referred to as the second spectrum comb) signaling. The second spectrum comb signaling is a 1-bit high-layer signaling.

The first spectrum comb is the comb in the existing protocols, and it is indicated with a 1-bit high-layer signaling whose value is 0 or 1; and the second spectrum comb is a new spectrum comb signaling, for example, it can be named comb2 and also indicated with a 1-bit high-layer signaling whose value is also 0 or 1.

The network side configures and notifies the R8/9/10 users and the R11 and later-version users of the first spectrum comb signaling; the network side notifies or does not notify the R11 and later-version users of the second spectrum comb signaling.

Figure 2:
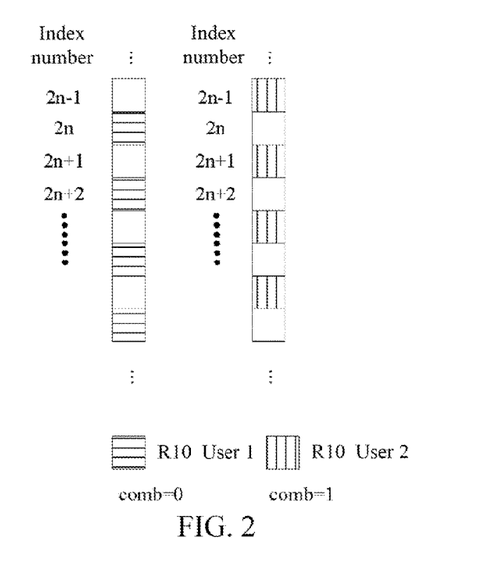
FIG. 2 is a schematic diagram of two R10 users multiplexing a spectrum comb in accordance with an embodiment of the present invention.

The R8/9/10 users receive the first spectrum comb signaling: if comb=0, the receiving side transmits the SRS in the even-numbered subcarriers of the occupied bandwidth (as indicated by the R10 user 1 in FIG. 2 and the R10 user in FIG. 3, wherein n in the figures is a natural number); otherwise, if comb=1, the receiving side transmits the SRS in the odd-numbered subcarriers of the occupied bandwidth (as indicated by the R10 user 2 in FIG. 2).

Figure 3:
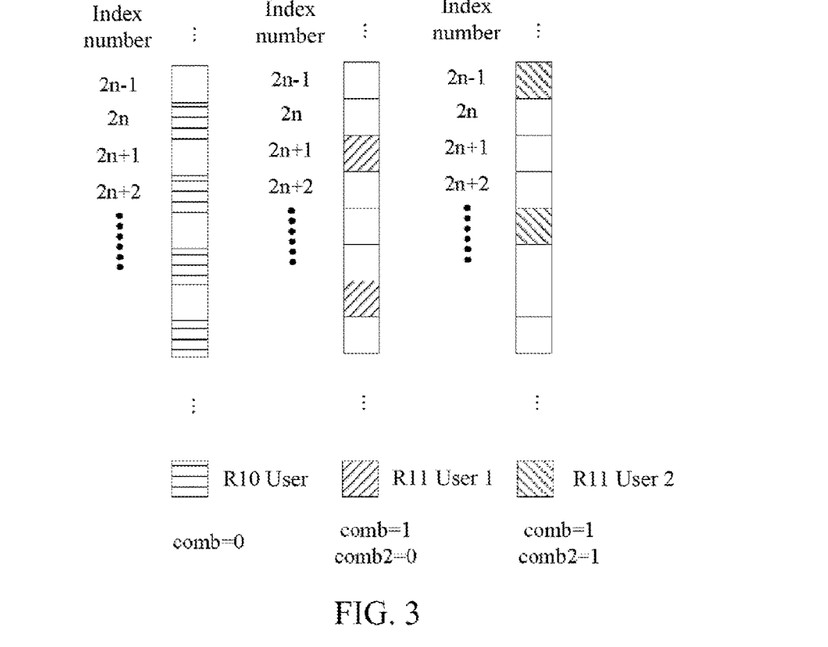
FIG. 3 is a schematic diagram of one R10 user and two R11 users multiplexing the spectrum comb in accordance with an embodiment of the present invention.

If the R11 and later-version users simultaneously receive the first spectrum comb signaling and the second spectrum comb signaling: if comb=0 and comb2=0, the receiving side transmits the SRS in even-numbered subcarrier positions with even-numbered subcarrier indexes of the occupied bandwidth; if comb=0 and comb2=1, the receiving side transmits the SRS in odd-numbered subcarrier positions with the even-numbered subcarrier indexes of the occupied bandwidth; if comb=1 and comb2=0, the receiving side transmits the SRS in the even-numbered positions with the odd-numbered subcarrier indexes of the occupied bandwidth (as indicated by the R11 user 1 in FIG. 3, and n in FIG. 3 is a natural number); and if comb=1 and comb2=1, the receiving side transmits the SRS in the odd-numbered positions with the odd-numbered subcarrier indexes of the occupied bandwidth (as indicated by the R11 user 2 in FIG. 3).

If the R11 and later-version users only receive the first spectrum comb signaling: if comb=0, the receiving side transmits the SRS on even-numbered and odd-numbered subcarrier positions with the even-numbered subcarrier indexes of the occupied bandwidth; otherwise, if comb=1, the receiving side transmits the SRS in even-numbered and odd-numbered subcarrier positions with the odd-numbered subcarrier indexes of the occupied bandwidth.

The Second Embodiment

The network side configures and notifies the receiving side of a two-layer spectrum comb signaling, including the spectrum comb (referred to as the first spectrum comb) signaling in existing protocols and a new spectrum comb (referred to as the second spectrum comb) signaling. The second spectrum comb signaling is a 2-bit high-layer signaling.

The first spectrum comb is the comb in the existing protocols and it is indicated with a 1-bit high-layer signaling whose value is 0 or 1; and the second spectrum comb is a new spectrum comb signaling, for example, it can be named comb2 and indicated with a 2-bit high-layer signaling whose value is 00 or 01 or 10 or 11.

The network side configures and notifies the R8/9/10 users of the first spectrum comb signaling; the network side configures and notifies the R11 and later-version users of the first spectrum comb signaling and the second spectrum comb signaling simultaneously.

The R8/9/10 users receive the first spectrum comb signaling: if comb=0, the receiving side transmits the SRS in the even-numbered subcarriers of the occupied bandwidth; otherwise, if comb=1, the receiving side transmits the SRS in the odd-numbered subcarriers of the occupied bandwidth.

If the R11 and later-version users receive the first spectrum comb signaling and the second spectrum comb signaling: if comb=0 and comb2=00, the receiving side transmits the SRS in even-numbered subcarrier positions with the even-numbered subcarrier indexes of the occupied bandwidth; if comb=0 and comb2=01, the receiving side transmits the SRS in odd-numbered subcarrier positions with the even-numbered subcarrier indexes of the occupied bandwidth; if comb=0 and comb2=10, the receiving side transmits the SRS in even-numbered and odd-numbered positions with the even-numbered subcarrier indexes of the occupied bandwidth; if comb=1 and comb2=00, the receiving side transmits the SRS in the even-numbered positions with the odd-numbered subcarrier indexes of the occupied bandwidth; and if comb=1 and comb2=01, the receiving side transmits the SRS in the odd-numbered positions with the odd-numbered subcarrier indexes of the occupied bandwidth; if comb=1 and comb2=10, the receiving side transmits the SRS in the even-numbered or odd-numbered positions with the odd-numbered subcarrier indexes of the occupied bandwidth.

The Third Embodiment

The network side configures and notifies the receiving side of two types of spectrum comb commands, including the spectrum comb (referred to as the first spectrum comb) signaling in existing protocols and a new spectrum comb (referred to as the second spectrum comb) signaling. The second spectrum comb signaling is a 3-bit high-layer signaling, and the attribute of the 3-bit high-layer signaling is UE-specific, and the second spectrum comb signaling performs joint encoding on the repetition factor and the spectrum comb value, that is, it jointly indicates the user's SRS repetition factor and spectrum comb value.

The first spectrum comb is the comb in the existing protocols and indicated with a 1-bit high-layer signaling whose value is 0 or 1; and the second spectrum comb is a new spectrum comb signaling, for example, it can be named comb2 and indicated with a 3-bit high-layer signaling, for example, it is named comb2 and has a total of eight values, wherein six states are used for indicating to the receiving side the SRS repetition factor value and spectrum comb value thereof, and the other two are the reserved states.

The network side configures and notifies the R8/9/10 users of the first type of spectrum comb signaling; the network side configures and notifies the R11 and later-version users of the second type of spectrum comb signaling.

The R8/9/10 users receive the first spectrum comb signaling: if comb=0, the receiving side transmits the SRS in even-numbered subcarriers of the occupied bandwidth; otherwise, if comb=1, the receiving side transmits the SRS in the odd-numbered subcarriers of the occupied bandwidth.

If the R11 and later-version users receive the second type of spectrum comb signaling: if comb2=000, the receiving side's SRS RPF=2 and its spectrum comb value is equal to 0, and the receiving side transmits the SRS in the even-numbered subcarriers of the occupied bandwidth; if comb2=001, the receiving side's SRS RPF=2 and its spectrum comb value is equal to 1, and the receiving side transmits the SRS in the odd-numbered subcarriers of the occupied bandwidth; if comb2=010, the receiving side's SRS RPF=4 and its spectrum comb value is equal to 0, and the receiving side transmits the SRS in the subcarriers corresponding to the subcarrier indexes which are a multiple of 4 within its bandwidth; if comb2=011, the receiving side's SRS RPF=4 and its spectrum comb value is equal to 1, and the receiving side transmits the SRS in the subcarriers corresponding to the subcarrier indexes which are a multiple of 4 plus 1 within its bandwidth; if comb2=100, the receiving side's SRS RPF=4 and its spectrum comb value is equal to 4, and the receiving side transmits the SRS in the subcarriers corresponding to the subcarrier indexes which are a multiple of 4 plus 2 within its bandwidth; if comb2=101, the receiving side's SRS RPF=4 and its spectrum comb value is equal to 4, and the receiving side transmits the SRS in the subcarriers corresponding to the subcarrier indexes which are a multiple of 4 plus 3 within its bandwidth;

The Fourth Embodiment

The network side configures and notifies the receiving side of a two-layer spectrum comb signaling, including the spectrum comb (referred to as the first spectrum comb) signaling in existing protocols and a new spectrum comb (referred to as the second spectrum comb) signaling. The second spectrum comb signaling is a 1-bit high-layer signaling, and it is the new 1-bit signaling in the existing physical layer signaling. The second spectrum comb signaling instructs the receiving side to occupy the odd-numbered subcarrier positions or even-numbered subcarrier positions of the subcarriers determined by the first spectrum comb signaling.

The first spectrum comb is the comb in the existing protocols and it is indicated with a 1-bit high-layer signaling whose value is 0 or 1; and the second spectrum comb is a new spectrum comb signaling, for example, it can be named comb2 and also indicated with the new 1-bit physical-layer signaling whose value is also 0 or 1.

The network side configures and notifies the R8/9/10 users and the R11 and later-version users of the first spectrum comb signaling and the second spectrum comb signaling.

The R8/9/10 users only receive the first spectrum comb signaling comb from the high layer, but cannot identify or analyze the second spectrum comb signaling comb2 from the physical layer: if comb=0, the receiving side transmits the SRS in the even-numbered subcarriers of the occupied bandwidth; otherwise, if comb=1, the receiving side transmits the SRS in the odd-numbered subcarriers of the occupied bandwidth.

Figure 4:
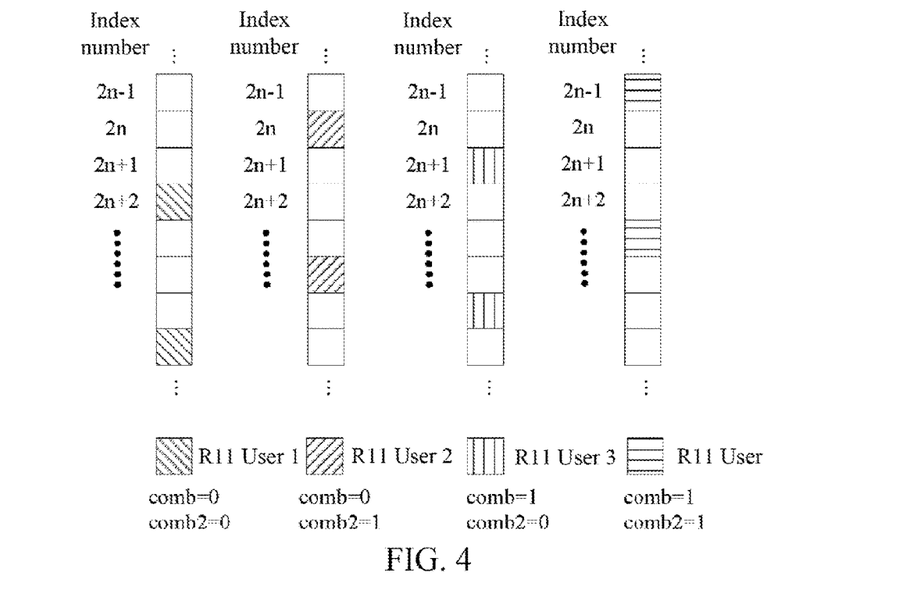
FIG. 4 is a schematic diagram of four R11 users multiplexing the spectrum comb in accordance with an embodiment of the present invention.

The R11 and later-version users receive the first spectrum comb signaling comb from the high layer and can receive and analyze the second spectrum comb signaling comb2 from the physical layer: if comb=0 and comb2=0, the receiving side transmits the SRS in even-numbered subcarrier positions with the even-numbered subcarrier indexes of the occupied bandwidth (as condition of the R11 user 1 in FIG. 4, and n in FIG. 4 is a natural number); if comb=0 and comb2=1, the receiving side transmits the SRS in the odd-numbered subcarrier positions with the even-numbered subcarrier indexes of the occupied bandwidth (as condition of the R11 user 2 in FIG. 4); if comb=1 and comb2=0, the receiving side transmits the SRS in the even-numbered positions with the odd-numbered subcarrier indexes of the occupied bandwidth (as condition of the R11 user 3 in FIG. 4); and if comb=1 and comb2=1, the receiving side transmits the SRS in the odd-numbered positions with the odd-numbered subcarrier indexes of the occupied bandwidth (as condition of the R11 user 4 in FIG. 4).

The Fifth Embodiment

The network side configures and notifies the receiving side of a two-layer spectrum comb signaling, including the spectrum comb (referred to as the first spectrum comb) signaling in existing protocols and a new spectrum comb (referred to as the second spectrum comb) signaling. The second spectrum comb signaling is a 2-bit physical-layer signaling and is a new 1-bit signaling in the existing physical layer signaling. The second spectrum comb signaling instructs the receiving side to occupy the odd-numbered subcarrier positions or even-numbered subcarrier positions of the subcarriers determined by the first spectrum comb signaling or all the subcarrier positions determined by the first spectrum comb signaling.

The first spectrum comb is the comb in the existing protocols and it is indicated with a 1-bit high-layer signaling whose value is 0 or 1; and the second spectrum comb is a new spectrum comb signaling, for example, it can be named comb2 and is indicated with a 2-bit physical layer signaling which has 4 values, wherein 3 states are used to indicate the subcarrier positions, and the other one is the reserved state.

The network side configures and notifies the R8/9/10 users and the R11 and later-version users of the first spectrum comb signaling and the second spectrum comb signaling.

The R8/9/10 users only receive the first spectrum comb signaling comb from the high layer, but cannot identify and analyze the second spectrum comb signaling comb2 from the physical layer: if comb=0, the receiving side transmits the SRS in the even-numbered subcarriers of the occupied bandwidth; otherwise, if comb=1, the receiving side transmits the SRS in the odd-numbered subcarriers of the occupied bandwidth.

The R11 and later-version users receive the first spectrum comb signaling comb from the high layer and can receive and analyze the second spectrum comb signaling comb2 from the physical layer: if comb=0 and comb2=00, the receiving side transmits the SRS in even-numbered subcarrier positions with the even-numbered subcarrier indexes of the occupied bandwidth; if comb=0 and comb2=01, the receiving side transmits the SRS in odd-numbered subcarrier positions with the even-numbered subcarrier indexes of the occupied bandwidth; if comb=1 and comb2=00, the receiving side transmits the SRS in the even-numbered subcarrier positions with the odd-numbered subcarrier indexes of the occupied bandwidth; if comb=1 and comb2=01, the receiving side transmits the SRS in the odd-numbered subcarrier positions with the odd-numbered subcarrier indexes of the occupied bandwidth; if comb=0 and comb2=10, the receiving side transmits the SRS in the even-numbered and odd-numbered subcarrier positions with the even-numbered subcarrier indexes of the occupied bandwidth; and if comb=1 and comb2=10, the receiving side transmits the SRS in the even-numbered and odd-numbered subcarrier positions with the odd-numbered subcarrier indexes of the occupied bandwidth.

The Sixth Embodiment

The network side configures and notifies the receiving side of a two-layer spectrum comb signaling, including the spectrum comb (referred to as the first spectrum comb) signaling in existing protocols and a new spectrum comb (referred to as the second spectrum comb) signaling. The second spectrum comb signaling is a K (K is an integer greater than 0) bit physical-layer signaling, and it performs an implicit indication by using the existing bits in the physical layer signaling.

The first spectrum comb is the comb in the existing protocols and indicated with a 1-bit high-layer signaling whose value is 0 or 1; the second spectrum comb is a new spectrum comb signaling, for example, it can be named comb2 whose value is 0 or 1 or 0&1 (0&1 indicates simultaneously being 0 and 1), and the indication is performed with existing K bits in the physical layer signaling.

The existing K-bit physical layer signaling may be one or more of the following information: 3-bit information indicating the cyclic shift and orthogonal mask index of a demodulation reference signal, request information of a measurement reference signal, high 1 bit or high 2 bits of resource block allocation information, high 1 bit or high 2 bits of modulation and coding scheme and redundancy version indication information, modulation and coding scheme and redundancy version indication information corresponding to a not-enabled transport block, and transmission power control signaling of the physical uplink control channel.

The network side configures and notifies the R8/9/10 users and the R11 and later-version users of the first spectrum comb signaling and the second spectrum comb signaling.

The R8/9/10 users only receive the first spectrum comb signaling comb from the high layer, and are not able to identify and analyze the second spectrum comb signaling comb2 from the physical layer: if comb=0, the receiving side transmits the SRS in the even-numbered subcarriers of the occupied bandwidth; otherwise if comb=1, the receiving side transmits the SRS in the odd-numbered subcarriers of the occupied bandwidth.

The R11 and later-version users receive the first spectrum comb signaling comb from the high layer, and is able to receive and analyze a second spectrum comb signaling comb2 implicitly indicated by the physical layer: if comb=0 and comb2=0, the receiving side transmits the SRS in even-numbered subcarrier positions with the even-numbered subcarrier indexes of the occupied bandwidth; if comb=0 and comb2=1, the receiving side transmits the SRS in odd-numbered subcarrier positions with the even-numbered subcarrier indexes of the occupied bandwidth; if comb=1 and comb2=0, the receiving side transmits the SRS in the even-numbered subcarrier positions with the odd-numbered subcarrier indexes of the occupied bandwidth; and if comb=1 comb2=1, the receiving side transmits the SRS in the odd-numbered subcarrier positions with the odd-numbered subcarrier indexes of the occupied bandwidth; if comb=0 and comb 2=0&1, the receiving side transmits the SRS in the even-numbered and odd-numbered subcarrier positions with the even-numbered subcarrier indexes of the occupied bandwidth; if comb=1 and comb2=0&1, the receiving side transmits the SRS in the even-numbered and odd-numbered subcarrier positions with the odd-numbered subcarrier indexes of the occupied bandwidth.

The Seventh Embodiment

The network side configures and notifies the receiving side of a two-layer spectrum comb signaling, including the spectrum comb (referred to as the first spectrum comb) signaling in the existing protocols and a new spectrum comb (referred to as the second spectrum comb) signaling. The second spectrum comb signaling is that the existing 3-bit information indicating the cyclic shift and orthogonal mask index of the demodulation reference signal in the physical layer signaling performs a joint indication.

The first spectrum comb is the comb in the existing protocols and indicated with a 1-bit high layer signaling whose value is 0 or 1; the second spectrum comb is a new spectrum comb signaling, for example, it can be named comb2, and its value is 0 or 1 or 0&1 (0&1 indicates simultaneously being 0 and 1).

The 3-bit information of the cycle shift and orthogonal mask index of the demodulation reference signal has a total of eight states which are used to implicitly indicate to the receiving side its second spectrum comb. For example, the states 0 to 2 are used for indicating comb2=0, the states 3-5 are used for indicating comb2=1, and the states 6-7 are used for indicating comb2=0&1, as shown in Table 1.

TABLE 1

| Cyclic shift and orthogonal mask index | $n_{DMRS,\lambda}^{(2)}$ | | | | $[w^{(\lambda)}(0)\ w^{(\lambda)}(1)]$ | | | | comb2 |
|---|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ | |
| 000 | 0 | 6 | 3 | 9 | [1 1] | [1 1] | [1 −1] | [1 −1] | 0 |
| 001 | 6 | 0 | 9 | 3 | [1 −1] | [1 −1] | [1 1] | [1 1] | 0 |
| 010 | 3 | 9 | 6 | 0 | [1 −1] | [1 −1] | [1 1] | [1 1] | 0 |
| 011 | 4 | 10 | 7 | 1 | [1 1] | [1 1] | [1 1] | [1 1] | 1 |
| 100 | 2 | 8 | 5 | 11 | [1 1] | [1 1] | [1 1] | [1 1] | 1 |
| 101 | 8 | 2 | 11 | 5 | [1 −1] | [1 −1] | [1 −1] | [1 −1] | 1 |
| 110 | 10 | 4 | 1 | 7 | [1 −1] | [1 −1] | [1 −1] | [1 −1] | 0&1 |
| 111 | 9 | 3 | 0 | 6 | [1 1] | [1 1] | [1 −1] | [1 −1] | 0&1 |

$n_{DMRS,\lambda}^{(2)}$ in Table 1 indicates the cyclic shift of a demodulation reference signal, $[w^{(\lambda)}(0)\ w^{(\lambda)}(1)]$ indicates the orthogonal mask of a demodulation reference signal, comb2 is the second layer of spectrum comb signaling.

The network side configures and notifies the R8/9/10 users and the R11 and later-version users of the first spectrum comb signaling and the second spectrum comb signaling.

The R8/9/10 users only receive the first spectrum comb signaling comb from the high layer, and are unable to identify and analyze the second spectrum comb signaling comb2 from the physical layer: if comb=0, the receiving side transmits the SRS in the even-numbered subcarriers of the occupied bandwidth; otherwise if comb=1, the receiving side transmits the SRS in the odd-numbered subcarriers of the occupied bandwidth.

The R11 and later-version users receive the first spectrum comb signaling comb from the high layer, and are able to receive and analyze the second spectrum comb signaling comb2 implicitly indicated by the physical layer: if comb=0 and comb2=0, the receiving side transmits the SRS in the even-numbered subcarrier positions with the even-numbered subcarrier indexes of the occupied bandwidth; and if comb=0 and comb2=1, the receiving side transmits the SRS in the odd-numbered subcarrier positions with the even-numbered subcarrier indexes of the occupied bandwidth; if comb=1 and comb2=0, the receiving side transmits the SRS in the even-numbered subcarrier positions with the odd-numbered subcarrier indexes of the occupied bandwidth; and if comb=1 and comb2=1, the receiving side transmits the SRS in the odd-numbered subcarrier positions with the odd-numbered subcarrier indexes of the occupied bandwidth; if comb=0 and comb2=0&1, the receiving side transmits the SRS in the even-numbered and odd-numbered subcarrier positions with the even-number subcarrier indexes of the occupied bandwidth; if comb=1 and comb2=0&1, the receiving side transmits the SRS in the even-numbered and odd-numbered subcarrier positions with the odd-numbered subcarrier indexes of the occupied bandwidth.

The spectrum comb signaling notification device in accordance with an embodiment of the present invention mainly comprises a configuration module and a notification module, wherein:

the configuration module is used to configure a spectrum comb signaling according to the configuration method in the abovementioned embodiments;

the notification module is used to notify the receiving side of the spectrum comb signaling configured by the configuration module.

Wherein, please refer to the configuration process of the abovementioned first to sixth methods as well as the first to seventh embodiments for the method of the configuration module configuring the spectrum comb signaling, which will not be repeated here.

The sounding reference signal transmission device according to an embodiment of the present invention mainly comprises a receiving module and a transmitting module, wherein:

the receiving module is used for receiving a spectrum comb signaling transmitted by the network side according to the abovementioned notification method;

the transmitting module is used for transmitting sounding reference signals in subcarrier positions indicated by the comb spectrum signaling received by the receiving module.

Wherein, please refer to the configuration and notification process of the abovementioned first to sixth methods as well as the first to seventh embodiments for the spectrum comb signaling received by the receiving module, which will not be repeated here.

A person skilled in the art should understand that respective components of the device and/or system provided in the embodiments of the present invention, as well as the respective steps in the method can be implemented by the general-purpose computing device, and they can be concentrated on a single computing device or distributed in a network consisting of multiple computing devices. Alternatively, they may be implemented by program codes executable by computing devices. Therefore, they can be stored in storage means and executed by computing devices, or they can be made into individual integrated circuit modules, or some of the modules or steps therein can be made into a single integrated circuit module to implement. Therefore, the embodiment of the present application is not limited to any specific hardware and software combination.

Although the embodiments of the present invention are disclosed as above, but the content is only the embodiments used to facilitate understanding the present document, and is not intended to limit the present document. Those skilled in the art of the present document can make any modifications and changes in forms and details of the implementation on the premise of without departing from the spirit and scope disclosed in the present document, but the patent protection scope of the present document is still subject to the scope defined by the appended claims.

INDUSTRIAL APPLICABILITY

In the embodiment of the present invention, it can pair the R11 and later-version users and the R8/9/10 users or the R11 and later-version users in the case of the SRS comb extension, which can reduce the scheduling restrictions and scheduling complexity due to the pairing, and is in favor of solving the backward compatibility problem caused by the SRS extension.

What is claimed is:

1. A spectrum comb signaling notification method, comprising:

a network side configuring and notifying a receiving side of a two-layer spectrum comb signaling, including a first spectrum comb signaling and a second spectrum comb signaling, and the two-layer spectrum comb signaling indicating subcarrier positions of transmitting sounding reference signals to the receiving side;

wherein the method further comprises: performing joint encoding on a repetition factor and a spectrum comb value to generating the second spectrum comb signaling;

wherein the first spectrum comb signaling is used to instruct a first user at the receiving side to determine the subcarrier positions of transmitting the sounding reference signals, and the second spectrum comb signaling is used to instruct a second user at the receiving side to determine the subcarrier positions of transmitting the sounding reference signals;

wherein the second spectrum comb signaling is a 3-bit high layer signaling, and an attribute of the 3-bit high layer signaling is UE-specific;

wherein the second spectrum comb signaling instructs the second user to occupy subcarrier positions whose subcarrier indexes are a multiple of 2, a multiple of 2 plus 1, a multiple of 4, a multiple of 4 plus 1, a multiple of 4 plus 2, or a multiple of 4 plus 3 within a sounding signal bandwidth.

2. The method of claim 1, wherein, the first spectrum comb signaling is used for instructing a user to determine first subcarrier positions of transmitting the sounding reference signals, and the second spectrum comb signaling is used for instructing a user to determine second subcarrier positions of transmitting the sounding reference signals;

the first subcarrier positions are odd-numbered subcarrier positions or even-numbered subcarrier positions within a sounding reference signal transmission bandwidth;

the second subcarrier positions are part or all of subcarrier positions in the first subcarrier positions within the sounding reference signal transmission bandwidth.

3. The method of claim 2, wherein,
the second spectrum comb signaling comprises a 1-bit high layer signaling or a 2-bit high layer signaling, and an attribute of the 1-bit high layer signaling or 2-bit high layer signaling is UE-specific,
wherein, when the second spectrum comb signaling is the 1-bit high layer signaling, the second subcarrier positions comprise:
odd-numbered subcarrier positions with odd-numbered subcarrier indexes within a sounding bandwidth of the sounding reference signals;
even-numbered subcarrier positions with odd-numbered subcarrier indexes within the sounding bandwidth of the sounding reference signals;
odd-numbered subcarrier positions with even-numbered subcarrier indexes within the sounding bandwidth of the sounding reference signals; or
even-numbered subcarrier positions with even-numbered subcarrier indexes within the sounding bandwidth of the sounding reference signals;
or
when the second spectrum comb signaling is the 2-bit high layer signaling, the second subcarrier positions comprise:
odd-numbered subcarrier positions with odd-numbered subcarrier indexes within a sounding bandwidth of the sounding reference signals;
even-numbered subcarrier positions with odd-numbered subcarrier indexes within the sounding bandwidth of the sounding reference signals;
odd-numbered subcarrier positions with even-numbered subcarrier indexes within the sounding bandwidth of the sounding reference signals;
even-numbered subcarrier positions with even-numbered subcarrier indexes within the sounding bandwidth of the sounding reference signals;
all subcarrier positions with odd-numbered subcarrier indexes within the sounding bandwidth of the sounding reference signals; or
all subcarrier positions with even-numbered subcarrier indexes within the sounding bandwidth of the sounding reference signals.

4. The method of claim 2, wherein,
the second spectrum comb signaling is a 1-bit physical layer signaling or a 2-bit physical layer signaling,
wherein, when the second spectrum comb signaling is a 1-bit physical layer signaling, the second spectrum comb signaling is used to instruct a user to occupy odd-numbered subcarrier positions or even-numbered subcarrier positions of subcarriers determined by the first spectrum comb signaling to transmit the sounding reference signals;
when the second spectrum comb signaling is a 2-bit physical layer signaling, the second spectrum comb signaling is used to instruct a user to occupy the odd-numbered subcarrier positions or the even-numbered subcarrier positions or all subcarrier positions of the subcarriers determined by the first spectrum comb signaling to transmit the sounding reference signals;
or
the second spectrum comb signaling is a K-bit physical layer signaling, and the K-bit physical layer signaling is one or more of following information:

3-bit information indicating a cyclic shift and orthogonal mask index of a demodulation reference signal;
request information of a measurement reference signal;
high 1 bit or high 2 bits of resource block allocation information;
high 1 bit or high 2 bits of modulation and coding scheme and redundancy version indication information;
modulation and coding scheme and redundancy version indication information corresponding to a not-enabled transport block;
transmission power control signaling of a physical uplink control channel;
wherein K is an integer greater than zero.

5. The method of claim 1, wherein, the first user is a 3rd generation partner project (3GPP) R8/9/10 user, and the second user is a 3GPP R11 or later-version user.

6. A sounding reference signal transmission method, comprising:
a receiving side receiving a two-layer spectrum comb signaling, including a first spectrum comb signaling and a second spectrum comb signaling, notified by a network side, and transmitting sounding reference signals in subcarrier positions indicated by the two-layer spectrum comb signaling;
wherein the second spectrum comb signaling is generated by performing joint encoding on a repetition factor and a spectrum comb value;
wherein a first user at the receiving side transmits the sounding reference signals in subcarrier positions indicated by the first spectrum comb signaling, and a second user at the receiving side transmits the sounding reference signals in subcarrier positions indicated by the second spectrum comb signaling;
wherein the second spectrum comb signaling is a 3-bit high layer signaling, and an attribute of the 3-bit high layer signaling is UE-specific;
wherein the second spectrum comb signaling indicates a repetition factor and a spectrum comb value, and the second user occupies subcarrier positions whose subcarrier indexes are a multiple of 2, a multiple of 2 plus 1, a multiple of 4, a multiple of 4 plus 1, a multiple of 4 plus 2, or a multiple of 4 plus 3 within a sounding signal bandwidth according to the second spectrum comb signaling.

7. The method of claim 6, wherein,
a user at the receiving side determines first subcarrier positions of transmitting the sounding reference signals according to the first spectrum comb signaling, and determines second subcarrier positions of transmitting the sounding reference signals according to the second spectrum comb signaling;
the first subcarrier positions are odd-numbered subcarrier positions or even-numbered subcarrier positions within a sounding reference signal transmission bandwidth;
the second subcarrier positions are part or all of subcarrier positions in the first subcarrier positions within the sounding reference signal transmission bandwidth.

8. The method of claim 7, wherein,
the second spectrum comb signaling comprises a 1-bit high layer signaling or a 2-bit high layer signaling, and an attribute of the 1-bit high layer signaling or 2-bit high layer signaling is UE-specific,
wherein, when the second spectrum comb signaling is a 1-bit high layer signaling, the second subcarrier positions comprise:

odd-numbered subcarrier positions with odd-numbered subcarrier indexes within a sounding bandwidth of the sounding reference signals;

even-numbered subcarrier positions with odd-numbered subcarrier indexes within the sounding bandwidth of the sounding reference signals;

odd-numbered subcarrier positions with even-numbered subcarrier indexes within the sounding bandwidth of the sounding reference signals; or even-numbered subcarrier positions with even-numbered subcarrier indexes within the sounding bandwidth of the sounding reference signals;

or when the second spectrum comb signaling is a 2-bit high layer signaling, the second subcarrier positions comprise:

odd-numbered subcarrier positions with odd-numbered subcarrier indexes within a sounding bandwidth of the sounding reference signals;

even-numbered subcarrier positions with odd-numbered subcarrier indexes within the sounding bandwidth of the sounding reference signals;

odd-numbered subcarrier positions with even-numbered subcarrier indexes within the sounding bandwidth of the sounding reference signals;

even-numbered subcarrier positions with even-numbered subcarrier indexes within the sounding bandwidth of the sounding reference signals;

all subcarrier positions with odd-numbered subcarrier indexes within the sounding bandwidth of the sounding reference signals; or all subcarrier positions with even-numbered subcarrier indexes within the sounding bandwidth of the sounding reference signals.

9. The method of claim 7, wherein, the second spectrum comb signaling is a 1-bit physical layer signaling or a 2-bit physical layer signaling, wherein, when the second spectrum comb signaling is a 1-bit physical layer signaling, the second spectrum comb signaling is used to instruct a user to occupy odd-numbered sub-carrier positions or even-numbered subcarrier positions of subcarriers determined by the first spectrum comb signaling to transmit the sounding reference signals;

when the second spectrum comb signaling is a 2-bit physical layer signaling, the second spectrum comb signaling is used to instruct a user to occupy the odd-numbered subcarrier positions or the even-numbered subcarrier positions or all subcarrier positions of the subcarriers determined by the first spectrum comb signaling to transmit the sounding reference signals;

or the second spectrum comb signaling is a K-bit physical layer signaling, and the K-bit physical layer signaling is one or more of following information:

3-bit information indicating a cyclic shift and orthogonal mask index of a demodulation reference signal;

request information of a measurement reference signal;

high 1 bit or high 2 bits of resource block allocation information;

high 1 bit or high 2 bits of modulation and coding scheme and redundancy version indication information;

modulation and coding scheme and redundancy version indication information corresponding to a not-enabled transport block;

transmission power control signaling of a physical uplink control channel;

wherein K is an integer greater than zero.

10. A spectrum comb signaling notification device, comprising:

a configuration module, configured to: configure a two-layer spectrum comb signaling, including a first spectrum comb signaling and a second spectrum comb signaling, for a receiving side;

a notification module, configured to notify the receiving side of a spectrum comb signaling configured by the configuration module;

wherein the configuration module is configured to perform joint encoding on a repetition factor and a spectrum comb value to generate the second spectrum comb signaling;

wherein the configuration module is configured to: configure the first spectrum comb signaling to be used to instruct a first user at the receiving side to determine subcarrier positions of transmitting sounding reference signals, and configure the second spectrum comb signaling to be used to instruct a second user at the receiving side to determine subcarrier positions of transmitting the sounding reference signals;

wherein the second spectrum comb signaling instructs the second user to occupy subcarrier positions whose subcarrier indexes are a multiple of 2, a multiple of 2 plus 1, a multiple of 4, a multiple of 4 plus 1, a multiple of 4 plus 2, or a multiple of 4 plus 3 within a sounding signal bandwidth.

11. The device of claim 10, wherein, the configuration module is configured to: configure the first spectrum comb signaling to instruct a user to determine first subcarrier positions of transmitting the sounding reference signals, and configure the second spectrum comb signaling to instruct a user to determine second subcarrier positions of transmitting the sounding reference signals;

the first subcarrier positions are odd-numbered subcarrier positions or even-numbered subcarrier positions within a sounding reference signal transmission bandwidth;

the second subcarrier positions are part or all of subcarrier positions in the first subcarrier positions within the sounding reference signal transmission bandwidth.

12. The device of claim 11, wherein, the configuration module is configured to: configure the second spectrum comb signaling to be a 1-bit high layer signaling, and the second subcarrier positions comprise:

odd-numbered subcarrier positions with odd-numbered subcarrier indexes within a sounding bandwidth of the sounding reference signals;

even-numbered subcarrier positions with odd-numbered subcarrier indexes within the sounding bandwidth of the sounding reference signals;

odd-numbered subcarrier positions with even-numbered subcarrier indexes within the sounding bandwidth of the sounding reference signals; or even-numbered subcarrier positions with even-numbered subcarrier indexes within the sounding bandwidth of the sounding reference signals;

or the configuration module is configured to: configure the second comb spectrum signaling to be a 2-bit high layer signaling, and the second subcarrier positions comprise:

odd-numbered subcarrier positions with odd-numbered subcarrier indexes within a sounding bandwidth of the sounding reference signals;
even-numbered subcarrier positions with odd-numbered subcarrier indexes within the sounding bandwidth of the sounding reference signals;
odd-numbered subcarrier positions with even-numbered subcarrier indexes within the sounding bandwidth of the sounding reference signals;
even-numbered subcarrier positions with even-numbered subcarrier indexes within the sounding bandwidth of the sounding reference signals;
all subcarrier positions with odd-numbered subcarrier indexes within the sounding bandwidth of the sounding reference signals; or
all subcarrier positions with even-numbered subcarrier indexes within the sounding bandwidth of the sounding reference signals;
or
the configuration module is configured to: configure the second spectrum comb signaling to be a 1-bit physical layer signaling which is used to indicate a user to occupy odd-numbered subcarrier positions or even-numbered subcarrier positions of subcarriers determined by the first spectrum comb signaling to transmit the sounding reference signals; or
configure the second spectrum comb signaling to be a 2-bit physical layer signaling which is used to indicate a user to occupy the odd-numbered subcarrier positions or the even-numbered subcarrier positions or all subcarrier positions of the subcarriers determined by the first spectrum comb signaling to transmit the sounding reference signals;
or
the configuration module is configured to: configure the second spectrum comb signaling to be a K-bit physical layer signaling, and the K-bit physical layer signaling is one or more of following information:
3-bit information indicating a cyclic shift and orthogonal mask index of a demodulation reference signal;
request information of a measurement reference signal;
high 1 bit or high 2 bits of resource block allocation information;
high 1 bit or high 2 bits of modulation and coding scheme and redundancy version indication information;
modulation and coding scheme and redundancy version indication information corresponding to a not-enabled transport block; and
transmission power control signaling of a physical uplink control channel;
wherein K is an integer greater than zero.

13. A sounding reference signal transmission device, comprising:
a receiving module, configured to: receive a two-layer spectrum comb signaling, including a first spectrum comb signaling and a second spectrum comb signaling, notified by a network side; and
a transmitting module, configured to: transmit sounding reference signals in subcarrier positions indicated by the spectrum comb signaling received by the receiving module;
wherein the second spectrum comb signaling is generated by performing joint encoding on a repetition factor and a spectrum comb value;
wherein the transmitting module is configured to: transmit sounding reference signals of a first user in subcarrier positions indicated by the first spectrum comb signaling, and transmit sounding reference signals of a second user in subcarrier positions indicated by the second spectrum comb signaling;
wherein the transmitting module is configured to: transmit the sounding reference signals of the second user in subcarrier positions which are indicated by the second spectrum comb signaling and whose subcarrier indexes are a multiple of 2, and a multiple of 2 plus 1, a multiple of 4, a multiple of 4 plus 1, a multiple of 4 plus 2, or a multiple of 4 plus 3 within an occupied sounding signal bandwidth.

14. The device of claim 13, wherein,
the transmitting module is configured to: determine first subcarrier positions of transmitting the sounding reference signals according to the first comb spectrum signaling, and determine second subcarrier positions of transmitting the sounding reference signals according to the second spectrum comb signaling;
the first subcarrier positions are odd-numbered subcarrier positions or even-numbered sub-carrier positions in a sounding reference signal transmission bandwidth;
the second sub-carrier positions are part or all of subcarrier positions in the first subcarrier positions in the sounding reference signal transmission bandwidth.

15. The device of claim 14, wherein,
the second spectrum comb signaling is a 1-bit high layer signaling, and the transmitting module is configured to determine that the second subcarrier positions comprise:
odd-numbered subcarrier positions with odd-numbered subcarrier indexes within a sounding bandwidth of the sounding reference signals;
even-numbered subcarrier positions with odd-numbered subcarrier indexes within the sounding bandwidth of the sounding reference signals;
odd-numbered subcarrier positions with even-numbered subcarrier indexes within the sounding bandwidth of the sounding reference signals; or
even-numbered subcarrier positions with even-numbered subcarrier indexes within the sounding bandwidth of the sounding reference signals;
or
the second comb spectrum signaling is a 2-bit high layer signaling, and the transmitting module is configured to determine that the second subcarrier positions comprise:
odd-numbered subcarrier positions with odd-numbered subcarrier indexes within a sounding bandwidth of the sounding reference signals;
even-numbered subcarrier positions with odd-numbered subcarrier indexes within the sounding bandwidth of the sounding reference signals;
odd-numbered subcarrier positions with even-numbered subcarrier indexes within the sounding bandwidth of the sounding reference signals;
even-numbered subcarrier positions with even-numbered subcarrier indexes within the sounding bandwidth of the sounding reference signals;
all subcarrier positions with odd-numbered subcarrier indexes within the sounding bandwidth of the sounding reference signals; or
all subcarrier positions with even-numbered subcarrier indexes within the sounding bandwidth of the sounding reference signals;
or
the second spectrum comb signaling is a 1-bit physical layer signaling, and the transmitting module is configured to: occupy odd-numbered subcarrier positions or even-numbered subcarrier positions of subcarriers determined by the first spectrum comb signaling to transmit the sounding reference signals; or the second spectrum comb signaling is a 2-bit physical layer signaling, and the transmitting module is configured to: occupy the odd-numbered subcarrier positions or the even-numbered subcarrier positions or all subcarrier positions of the subcarriers determined by the first spectrum comb signaling to transmit the sounding reference signals;

or the second spectrum comb signaling is a K-bit physical layer signaling, and the K-bit physical layer signaling is one or more of following information:

3-bit information indicating a cyclic shift and orthogonal mask index of a demodulation reference signal;

request information of a measurement reference signal;

high 1 bit or high 2 bits of resource block allocation information;

high 1 bit or high 2 bits of modulation and coding scheme and redundancy version indication information;

modulation and coding scheme and redundancy version indication information corresponding to a not-enabled transport block; and transmission power control signaling of a physical uplink control channel;

wherein K is an integer greater than zero.

* * * * *